(12) United States Patent
Pellom et al.

(10) Patent No.: US 10,235,573 B2
(45) Date of Patent: Mar. 19, 2019

(54) LOW-FIDELITY ALWAYS-ON AUDIO/VIDEO MONITORING

(71) Applicant: Sensory, Incorporated, Santa Clara, CA (US)

(72) Inventors: Bryan Pellom, Erie, CO (US); Todd F. Mozer, Los Altos Hills, CA (US)

(73) Assignee: Sensory, Incorporated, Santa Clara, CA (US)

( * ) Notice: Subject to any disclaimer, the term of this patent is extended or adjusted under 35 U.S.C. 154(b) by 143 days.

(21) Appl. No.: 15/270,757

(22) Filed: Sep. 20, 2016

(65) Prior Publication Data

US 2018/0084228 A1    Mar. 22, 2018

(51) Int. Cl.
*G06K 9/00* (2006.01)
*H04N 7/18* (2006.01)
*H04N 5/232* (2006.01)

(52) U.S. Cl.
CPC ......... *G06K 9/00771* (2013.01); *H04N 7/188* (2013.01); *H04N 5/23245* (2013.01)

(58) Field of Classification Search
CPC . G06K 9/00771; H04N 7/183; H04N 5/23245
See application file for complete search history.

(56) References Cited

U.S. PATENT DOCUMENTS

| 6,067,399 | A | * | 5/2000 | Berger | H04N 5/772 386/280 |
|---|---|---|---|---|---|
| 2007/0116328 | A1 | * | 5/2007 | Sablak | G06K 9/00362 382/103 |
| 2008/0267403 | A1 | * | 10/2008 | Boult | H04L 9/0894 380/255 |
| 2010/0328460 | A1 | * | 12/2010 | Merkel | G06K 9/00771 348/143 |
| 2011/0102670 | A1 | * | 5/2011 | Tanji | H04N 5/765 348/384.1 |
| 2013/0004090 | A1 | * | 1/2013 | Kundu | G07F 19/207 382/232 |

* cited by examiner

*Primary Examiner* — Huy T Nguyen
(74) *Attorney, Agent, or Firm* — Fountainhead Law Group P.C.

(57) ABSTRACT

Techniques for performing low-fidelity always-on A/V monitoring are provided. In one embodiment, an always-on A/V monitoring system can record audio or video footage of an area of interest on a continuous basis while operating in a low-fidelity recording mode, where the recorded audio or video footage has a quality level that is sufficient to detect one or more events that have meaning to the system or a user, but is insufficient to recognize details with respect to the area of interest that would be considered private to an individual appearing in, or associated with, the recorded audio or video footage.

19 Claims, 4 Drawing Sheets

LOW-FIDELITY ALWAYS-ON AUDIO/VIDEO MONITORING

BACKGROUND

Audio/video (A/V) monitoring systems are commonly used in both public and private environments for monitoring areas of interest in those environments for security and/or other purposes. Such systems typically include one or more video cameras with attached or separate microphones that capture audio/video feeds of the monitored areas and store the captured footage on a connected recording device (e.g., a local or remote computing device/system). The captured footage may also be sent in real-time to a display device for viewing by an interested party (e.g., a homeowner, security guard, law enforcement officer, etc.).

From a security perspective, an A/V monitoring system is most effective when it is "always-on" (i.e., capturing audio and video of an area of interest on a continuous and ongoing basis). This is because an always-on system can capture all attempted intrusions, thefts, or other security-related events within the vicinity of the monitored area regardless of when those events may occur. However, as may be appreciated, always-on A/V monitoring can raise privacy concerns when used in a private setting such as a home. For example, assume that a homeowner has an always-on A/V monitoring system installed in his/her house for security purposes, with a camera and microphone that are configured to constantly capture all activity within the homeowner's living room. In this scenario, the homeowner may feel uncomfortable about being "watched" and "listened to" on a continuous basis as the homeowner and his/her family interact in the living room. In addition, the homeowner may have concerns about who may get ahold of the recorded audio/video footage and what it may potentially be used for. This is particularly true if the A/V monitoring system is operated by a third-party service provider and the recorded footage is sent to a remote server operated by the service provider.

One way to mitigate these privacy concerns is to configure the A/V monitoring system such that all recorded audio/video footage is stored "on-premise"—in other words, stored locally on one or more recording devices that are physically located at the homeowner's home and are controlled by the homeowner, rather than being transmitted to a remote/cloud-based server. But, even with this type of configuration, it is possible for a malicious party to hack or steal the on-premise device(s) and thereby gain unauthorized access to the footage.

Another solution is to allow the homeowner to disable and enable the A/V monitoring system at-will, which effectively changes the nature of the system from "always-on" to "on-demand." Unfortunately, this approach reduces the effectiveness of the system since the homeowner cannot be sure of when a security beach or emergency situation may occur. Further, this approach is cumbersome because it requires the homeowner to manually interact with the monitoring system each time he/she wishes to turn on or turn off the system's cameras and microphones.

SUMMARY

Techniques for performing low-fidelity always-on A/V monitoring are provided. In one embodiment, an always-on A/V monitoring system can record audio or video footage of an area of interest on a continuous basis while operating in a low-fidelity recording mode, where the recorded audio or video footage has a quality level that is sufficient to detect one or more events that have meaning to the system or a user, but is insufficient to recognize details with respect to the area of interest that would be considered private to an individual appearing in, or associated with, the recorded audio or video footage.

A further understanding of the nature and advantages of the embodiments disclosed herein can be realized by reference to the remaining portions of the specification and the attached drawings.

DETAILED DESCRIPTION

Figure 1:
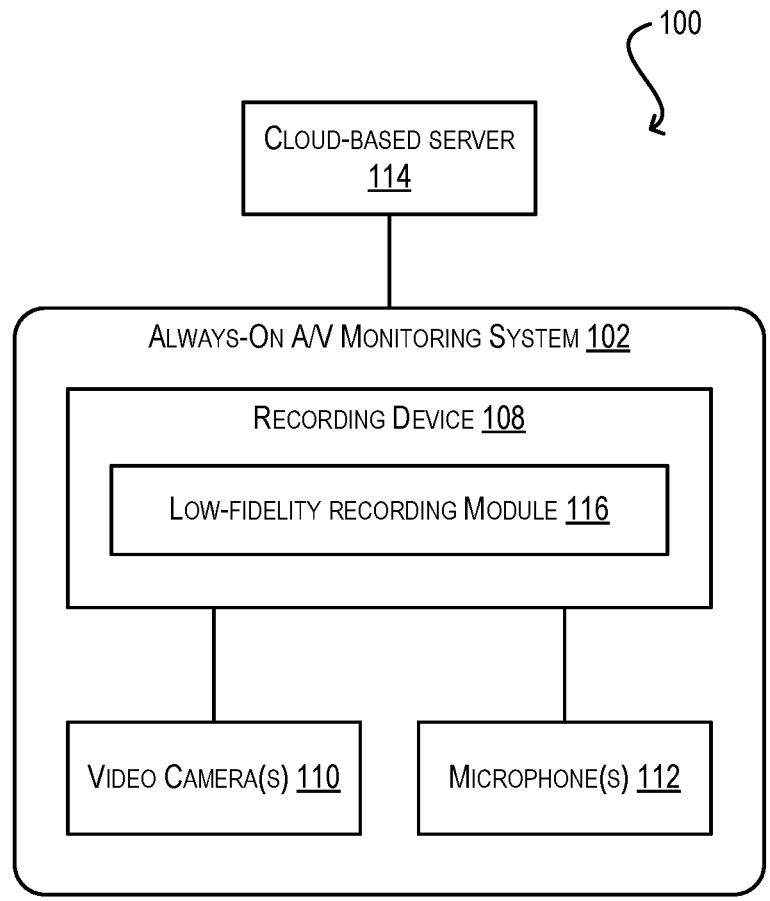
FIG. 1 depicts an example environment in which embodiments of the present disclosure may be implemented.
Figure 1:
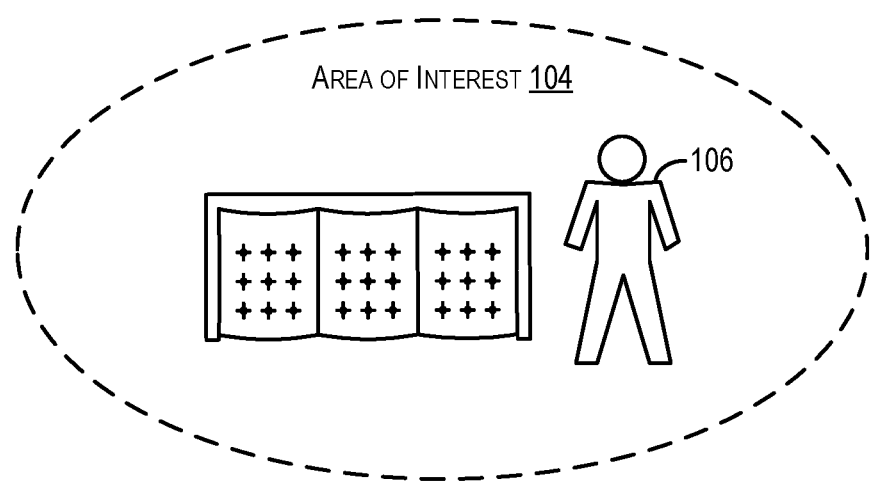

In the following description, for purposes of explanation, numerous examples and details are set forth in order to provide an understanding of specific embodiments. It will be evident, however, to one skilled in the art that certain embodiments can be practiced without some of these details, or can be practiced with modifications or equivalents thereof.

1. Overview

Embodiments of the present disclosure provide techniques that can be implemented by an always-on A/V monitoring system for recording audio and/or video of an area of interest in a low-fidelity recording mode. While in the low-fidelity recording mode, the audio/video can be recorded at a quality level that is sufficient for detecting the occurrence of "meaningful" events in the monitored area (e.g., events related to security, such as the presence/movement of someone or something, glass breaking, a fire or explosion, etc.), but is insufficient for recognizing more specific details that may be considered sensitive or private to an individual that appears in, or is associated with, the recorded footage (e.g., the exact nature of what the individual is saying, doing, wearing, etc.). Thus, with these techniques, the privacy concerns arising out of always-on A/V monitoring in non-public environments can be significantly reduced.

In certain embodiments, upon detecting that a particular event has occurred in the low-fidelity footage, the always-on A/V monitoring system of the present disclosure can switch from the low-fidelity recording mode to a high-fidelity recording mode. While in the high-fidelity recording mode, the system can record audio and/or video at a quality level that exposes more details of the monitored area/scene than the quality level of the low-fidelity recording mode, thereby providing more information to the system and the system's owner regarding what is happening there. With this switching mechanism, the system can intelligently balance security and privacy needs by capturing low-fidelity footage when security risks appear to be relatively low (i.e., when no security-related events are detected), and capturing high-fidelity footage when security risks appear to be elevated (i.e., when a security-related event is detected in the low-fidelity footage). In a particular embodiment, the high-fidelity footage may be maintained solely on-premise at the location where the system is installed in order to minimize the likelihood that the high-fidelity footage is stolen or compromised.

In other embodiments, the always-on A/V monitoring system may be configured to perform other types of actions upon detecting the occurrence, or non-occurrence, of events in the low-fidelity footage. For example, the system may automatically turn off all lights in the monitored area if the system does not detect any movement for a predefined time interval, or may automatically call the fire department upon detecting a fire. These actions may be set via user-defined policies.

The foregoing and other aspects of the present disclosure are described in further detail in the sections that follow.

2. Example Environment

FIG. 1 depicts an example environment 100 in which embodiments of the present disclosure may be implemented. As shown, environment 100 includes an always-on A/V monitoring system 102 that is configured to monitor an area of interest 104 on a continuous, ongoing basis. In this particular example, area 104 is a location within the home of a homeowner 106 (e.g., a living room), although area 104 may correspond to any other location where individuals may expect to have a degree of privacy (e.g., a private office/workspace, a hotel room, etc.).

Always-on A/V monitoring system 102 comprises a recording device 108, one or more video cameras 110, and one or more microphones 112. Using video camera(s) 110 and microphone(s) 112, system 102 can capture audio and video feeds of area 104 in an always-on manner and record those feeds, via recording device 108, onto a temporary or permanent storage medium. This storage medium may be maintained locally by system 102 (e.g., on recording device 108) or remotely on a cloud-based server 114. In some embodiments, always-on A/V monitoring system 102 may also present a live version of the video and audio feeds to the homeowner or another authorized user via one or more display devices (not shown).

As noted in the Background section, although always-on A/V monitoring systems provide a high level of security because they are constantly running/active, their always-on nature can raise significant privacy concerns in non-public environments such as the home environment shown in FIG. 1. For example, homeowner 106 of FIG. 1 may feel uncomfortable knowing that video camera(s) 110 and microphone(s) 112 are capturing everything he/she does or says while in living room 104. Homeowner 106 may also have concerns that the recorded footage may be accessed by unauthorized parties and/or distributed for unauthorized purposes (e.g., advertising, etc.).

To address these and other similar issues, always-on A/V monitoring system 102 of FIG. 1 is enhanced to support a novel low-fidelity recording mode. In the example of FIG. 1, support for this mode is implemented via a software-based low-fidelity recording module 116 that runs on recording device 108. However, support for this mode may also be implemented via other software and/or hardware modules that are included in other components of system 102. As described in further detail below, when operating in low-fidelity recording mode, always-on A/V monitoring system 102 can record audio and/or video of area 104 at a quality level that allows system 102 to detect certain high-level events that have meaning to the system and/or the system's owner (e.g., security-related events), but at the same time obscures more granular details of the area/scene that may be considered to constitute sensitive or private information (e.g., the identities of the individuals interacting in the area, the exact content of what they are saying, the exact nature of what they are doing, etc.). In this way, system 102 can provide a monitoring solution that is less invasive than, and yet comparable in effectiveness to, conventional always-on A/V monitoring systems.

It should be appreciated that environment 100 of FIG. 1 is illustrative and not intended to limit embodiments of the present disclosure. For example, the various entities shown in system environment 100 may be arranged according to different configurations, and/or may include subcomponents or implement functions that are not specifically described herein. One of ordinary skill in the art will recognize many variations, modifications, and alternatives.

3. Workflows

Figure 2:
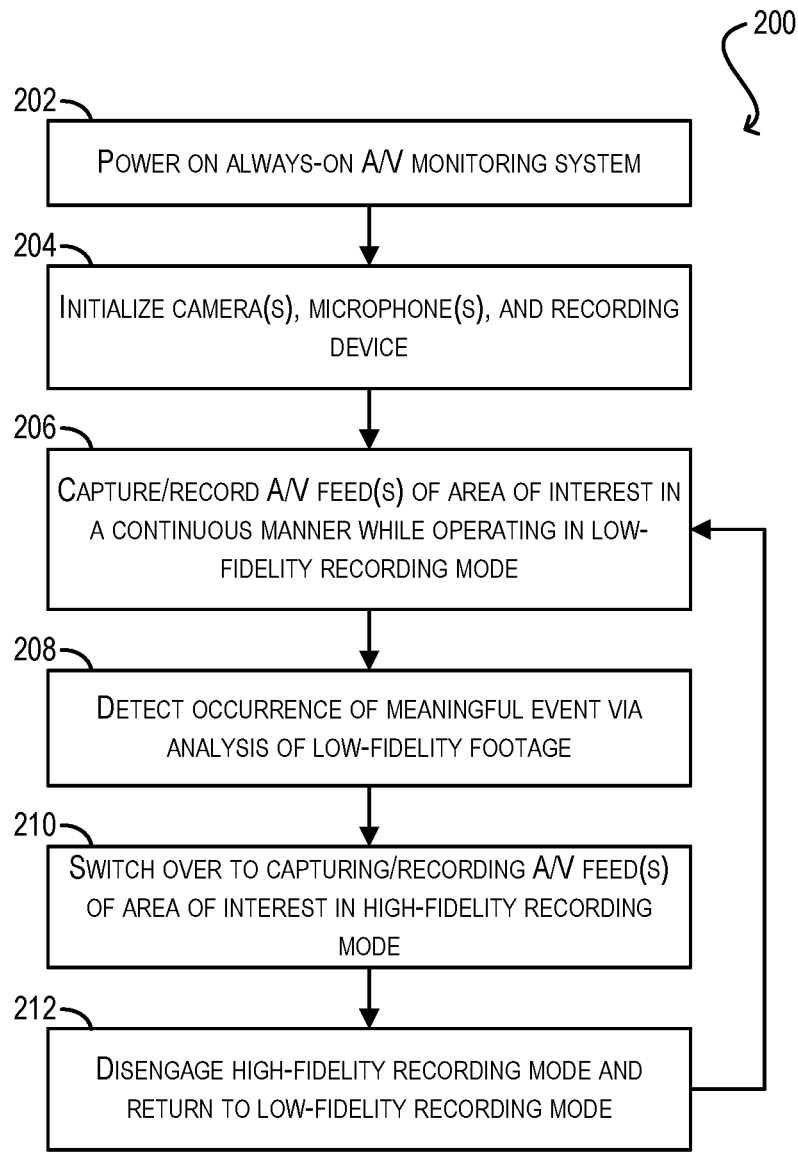
FIG. 2 depicts a first workflow for performing low-fidelity always-on A/V monitoring according to an embodiment.

FIG. 2 depicts a workflow 200 that can be performed by always-on A/V monitoring system 102 of FIG. 1 for performing low-fidelity always-on monitoring according to an embodiment.

Starting with block 202, always-on A/V monitoring system 102 can be powered-on for the purpose of monitoring an area of interest (e.g., area 104 of FIG. 1). In response, system 102 can initialize its video camera(s) 110, microphone(s) 112, and recording device 108 (block 204), and can begin capturing/recording audio and video feeds of area 104 via these components in a continuous, always-on manner (block 206). As the footage is being captured/recorded, system 102 can store a copy of the footage to a nonvolatile storage medium resident on system 102 and/or on cloud-based server 114.

Significantly, unlike conventional A/V monitoring solutions, always-on A/V monitoring system 102 can perform it's capture and recording operations at block 206 using a low-fidelity recording mode—in other words, system 102 can record the audio and video at a relatively low quality level that is sufficient to detect certain high-level events that are deemed to have meaning to the system or its owner, but is insufficient to recognize more specific details regarding area 104 or the activities occurring within area 104 that may be considered sensitive/private to an individual that appears in, or is associated with, the recorded footage. For example, in one embodiment, the A/V footage that system 102 records while in the low-fidelity recording mode may allow the system (or a human reviewing the footage) to detect the presence/movement/entrance/exit of individuals in area 104, but may not be clear enough to allow recognition of the identities of those individuals, exactly what they are saying, exactly what they are wearing, exactly what they are doing, etc. As another example, the A/V footage that system 102 records while in the low-fidelity recording mode may allow the system (or a human reviewing the footage) to detect occurrence of certain environmental hazards (e.g., a fire, an explosion, etc.), but may not be clear enough to allow recognition of the exact objects within, or configuration of, area 104.

There are various ways in which always-on A/V monitoring system 102 can implement the low-fidelity recording mode. With respect to video captured via camera(s) 110, system 102 may record the video using a lower bit-rate than normal, or may apply one or more transformations/filters to the video feed that visually distort its appearance (e.g., blur, mosaic, swizzle, etc.). Similarly, with respect to audio captured via microphone(s) 112, system 102 may record the audio at a lower bit-rate than normal, or may apply one or more transformations/filters to the audio feed that audibly change its nature (e.g., high-pass frequency filter, low-pass frequency filter, etc.). One of ordinary skill in the art will recognize other variations and alternatives, which are contemplated to be within the scope of the present disclosure. In either of these cases, the degree of distortion/transformation applied while in the low-fidelity recording mode may be enough to mask the semantics of who is in area, what's being said, etc., but not so strong as to prevent detection of meaningful events as defined above.

At block 208, after always-on A/V monitoring system 102 has been operating in the low-fidelity recording mode for some time, the occurrence of a meaningful event in the low-fidelity footage may be detected (e.g., presence of an individual in area 104, occurrence of an environmental hazard, etc.). This detection can be performed via, e.g., a computational analysis of the footage that is executed by system 102 or a remote resource (e.g., cloud-based server 114). In response to this detection, always-on A/V monitoring system 102 can automatically switch over from the low-fidelity recording mode to a high-fidelity recording mode (block 210). While in the high-fidelity recording mode, system 102 can record the audio/video feeds of monitored area 104 at a significantly higher quality level than the low-fidelity recording mode (e.g., a quality level that is consistent with existing A/V monitoring systems). This can involve, e.g., increasing the bit-rate of the audio/video recordings, or removing the transformations/filters that were previously applied. By switching over to the high-fidelity recording mode, always-on A/V monitoring system 102 can collect more information regarding area 104 in situations where it appears to be warranted (e.g., situations where a security threat is detected).

Since the high-fidelity recording mode enables system 102 to capture and record scene details that could potentially be deemed private, in some embodiments system 102 may be configured to store the recorded high-fidelity footage solely on-premise (e.g., at the location where the system is installed). This can minimize the likelihood that the high-fidelity footage is stolen or compromised. In contrast, the low-fidelity footage that is recorded while in the low-fidelity recording mode may be stored on-premise or at a remote location (e.g., cloud-based server 114).

At block 212, after always-on A/V monitoring system 102 has been operating in the high-fidelity recording mode for some time, system 102 can disengage the high-fidelity recording mode and return to the low-fidelity recording mode. The specific conditions that trigger this switch back to the low-fidelity recording mode can be configurable by a user. For instance, in one embodiment, system 102 may automatically return to the low-fidelity recording mod after a configurable time interval has passed from the detection of the high-level event at block 208. In another embodiment, system 102 may return to the low-fidelity recording mode only after an individual (e.g., the system owner) has reviewed the high-fidelity footage recorded at block 210 and explicitly indicated to the system than high-fidelity recording is no longer needed. Finally, at the conclusion of block 212, always-on A/V monitoring system 102 can return to block 202 so that it can resume its default monitoring in the low-fidelity recording mode, and this process can repeat until the system is powered-off or reset.

It should be appreciated that workflow 200 of FIG. 2 and its accompanying description are illustrative and various modifications are possible. For example, the exact nature of what may and may not be detectable by system 102 while operating in the low-fidelity recording mode can vary depending upon the particular implementation. In some embodiments (as indicated above), system 102 may only be able to detect the presence of individuals in area 104, and may not be able to detect their identities. In other embodiments, system 102 may be able to detect the identities of those individuals (based on characteristics such as size, frequency spectrum of speech, etc.), but may not be able recognize other details such as what they are saying, what they are doing, etc. Accordingly, the embodiments of the present disclosure are not limited to presence detection only, and instead may be applied to detect a range of information based on the low-fidelity footage.

Further, in certain embodiments, the specific quality levels of the audio/video footage captured in the low-fidelity and high-fidelity recording modes may be configurable by a user, and this can play a role in what is detectable versus non-detectable in the low-fidelity footage. This quality level may be configured collectively for both audio and video, or may be configured independently for each type of medium (e.g., higher quality level for video and lower quality level for audio, etc.).

Figure 3:
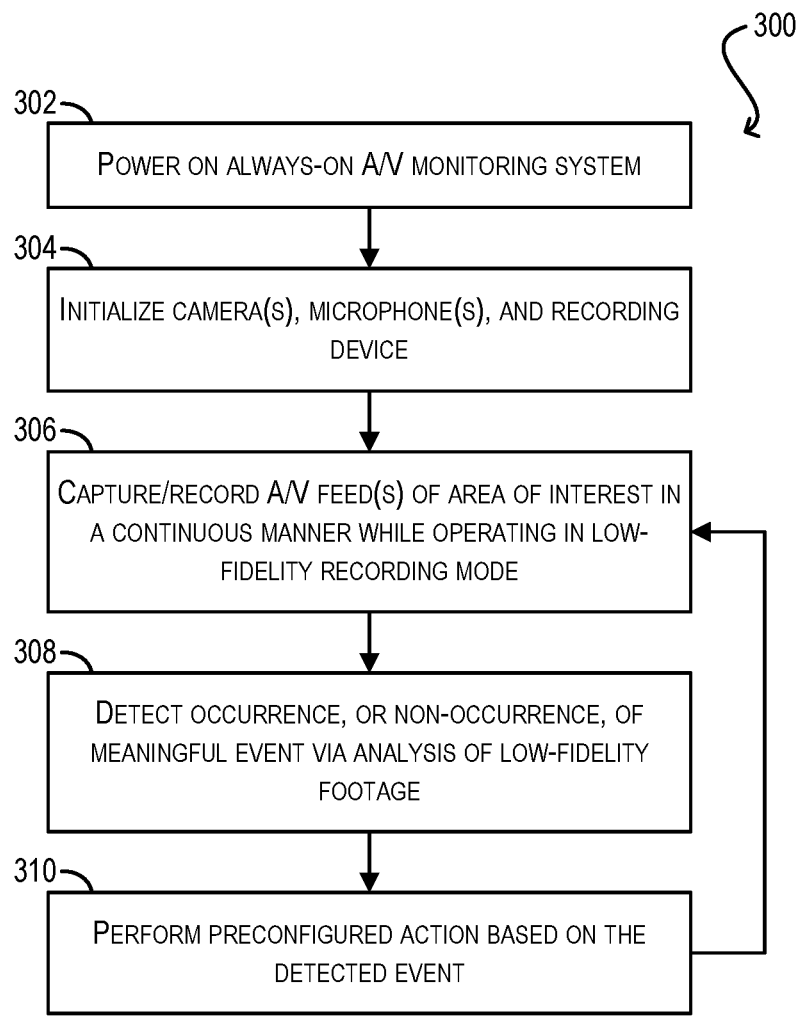
FIG. 3 depicts a second workflow for performing low-fidelity always-on A/V monitoring according to an embodiment.

Yet further, in certain embodiments, always-on A/V monitoring system 102 can perform other configurable behaviors/actions based on its analysis of the low-fidelity footage and the occurrence, or non-occurrence, of meaningful events. This concept is shown in FIG. 3 as workflow 300. Blocks 302-308 of workflow 300 are substantially similar to workflow 200 of FIG. 2; however, at block 310, in response to the detection of a meaningful event in the low-fidelity footage, system 102 can perform a preconfigured action based on the nature of the detected event. For example, if system 102 detects the outbreak of a fire, the system can automatically contact the fire department. As another example, if system 102 detects the presence/movement of an individual when none is expected (e.g., homeowner is away on vacation), the system can automatically contact the police department. As yet another example, if system 102 detects the non-occurrence of an event for some period of time, the system can perform an appropriate action based on that non-occurrence (e.g., turn off all lights and turn down thermostat if no motion detected after X hours or days, etc.). One of ordinary skill in the art will recognize other variations, modifications, and alternatives.

4. Example Computer System

Figure 4:
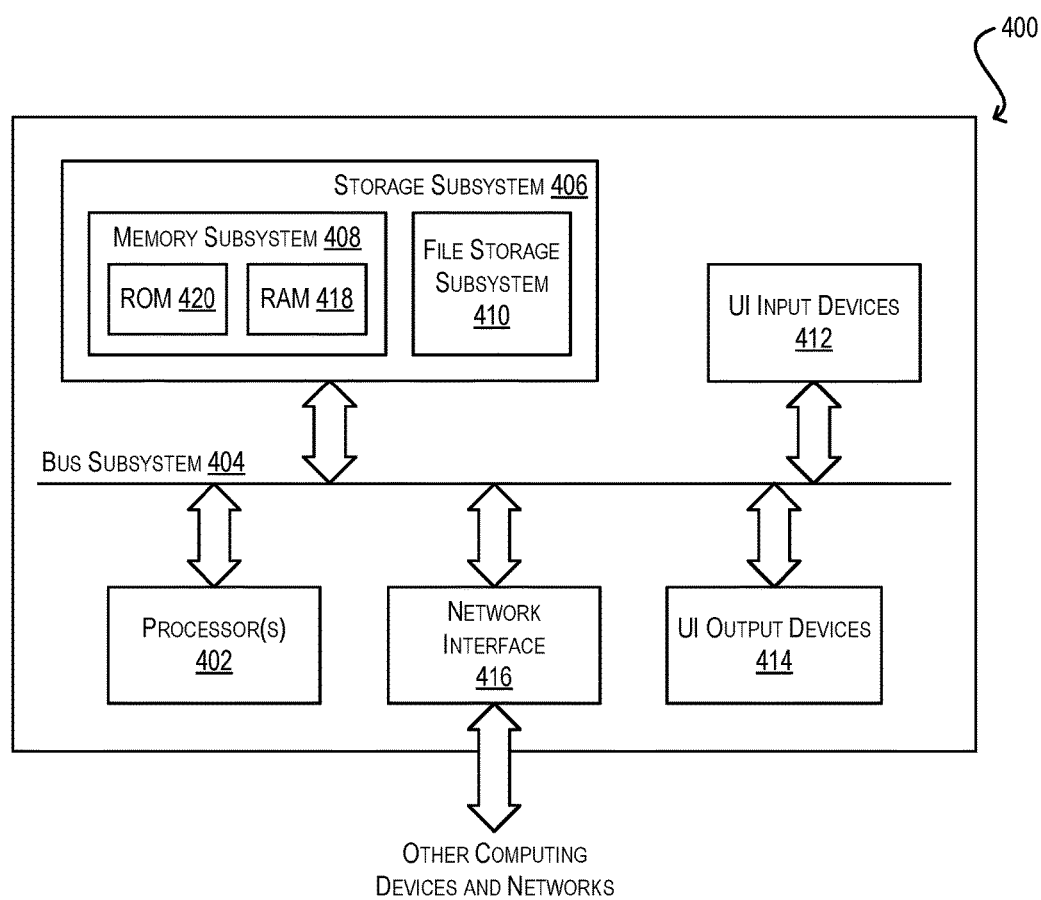
FIG. 4 depicts an example computing device/system according to an embodiment.

FIG. 4 is a simplified block diagram of a computing system/device 400 that may be used to implement embodiments of the present disclosure. For example, computing system/device 400 may be used to implement recording device 108 of always-on A/V monitoring system 102 of FIG. 1. As shown, computing system/device 400 can include one or more processors 402 that communicate with a number of peripheral devices via a bus subsystem 404. These peripheral devices can include a storage subsystem 406 (comprising a memory subsystem 408 and a file storage subsystem 410), user interface input devices 412, user interface output devices 414, and a network interface subsystem 416.

Bus subsystem 404 can provide a mechanism for letting the various components and subsystems of computing system/device 400 communicate with each other as intended. Although bus subsystem 404 is shown schematically as a single bus, alternative embodiments of the bus subsystem can utilize multiple busses.

Network interface subsystem 416 can serve as an interface for communicating data between computing system/device 400 and other computing devices or networks. Embodiments of network interface subsystem 416 can include wired (e.g., coaxial, twisted pair, or fiber optic Ethernet) and/or wireless (e.g., Wi-Fi, cellular, Bluetooth, etc.) interfaces.

User interface input devices 412 can include a touchscreen incorporated into a display, a keyboard, a pointing device (e.g., mouse, touchpad, etc.), an audio input device (e.g., a microphone), and/or other types of input devices. In general, use of the term "input device" is intended to include all possible types of devices and mechanisms for inputting information into computing system/device 400.

User interface output devices 414 can include a display subsystem (e.g., a flat-panel display), an audio output device (e.g., a speaker), and/or the like. In general, use of the term "output device" is intended to include all possible types of devices and mechanisms for outputting information from computing system/device 400.

Storage subsystem 406 can include a memory subsystem 408 and a file/disk storage subsystem 410. Subsystems 408 and 410 represent non-transitory computer-readable storage media that can store program code and/or data that provide the functionality of various embodiments described herein.

Memory subsystem 408 can include a number of memories including a main random access memory (RAM) 418 for storage of instructions and data during program execution and a read-only memory (ROM) 420 in which fixed instructions are stored. File storage subsystem 410 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computing system/device 400 is illustrative and not intended to limit embodiments of the present disclosure. Many other configurations having more or fewer components than computing system/device 400 are possible.

The above description illustrates various embodiments of the present disclosure along with examples of how aspects of the present disclosure may be implemented. The above examples and embodiments should not be deemed to be the only embodiments, and are presented to illustrate the flexibility and advantages of the subject matter described herein. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted.

Further, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
   recording, by an always-on audio/video (A/V) monitoring system, audio or video footage of an area of interest on a continuous basis while operating in a low-fidelity recording mode, wherein the audio or video footage recorded in the low-fidelity recording mode has a quality level that is sufficient to detect one or more events that have meaning to the always-on A/V monitoring system or a user, but is insufficient to recognize details with respect to the area of interest that would be considered private to an individual appearing in, or associated with, the audio or video footage;
   detecting, by the always-on A/V monitoring system, an occurrence of one of the one or more events in the audio or video footage recorded in the low-fidelity recording mode; and
   in response to the detecting, switching, by the always-on A/V monitoring system, from the low-fidelity recording mode to a high-fidelity recording mode, wherein while operating in the high-fidelity recording mode, the always-on A/V monitoring system is configured to record audio or video footage of the area of interest at a quality level that is higher than the quality level of the low-fidelity recording mode.

2. The method of claim 1 wherein recording the audio or video footage in the low-fidelity recording mode comprises recording the audio or video footage at a relative low bit-rate.

3. The method of claim 1 wherein recording the audio or video footage in the low-fidelity recording mode comprises applying one or more transformations or filters to the audio or video footage.

4. The method of claim 3 wherein the one or more transformations or filters includes a visual distortion or blur filter.

5. The method of claim 3 wherein the one or more transformations or filters include an audio-based frequency filter.

6. The method of claim 1 wherein the one or more events that have meaning to the always-on A/V monitoring system or the user include presence, movement, entry, or exit of an individual in the area of interest.

7. The method of claim 1 wherein the one or more events that have meaning to the always-on A/V monitoring system or the user include occurrence or presence of an environmental hazard.

8. The method of claim 1 wherein the details that would be considered private by an individual appearing in, or associated with, the audio or video footage include the identity of the individual.

9. The method of claim 1 wherein the details that would be considered private by an individual appearing in, or associated with, the audio or video footage include details regarding what the individual is saying while in the area of interest.

10. The method of claim 1 wherein the details that would be considered private by an individual appearing in, or associated with, the audio or video footage include details regarding what the individual is doing while in the area of interest.

11. The method of claim 1 wherein the details that would be considered private by an individual appearing in, or associated with, the audio or video footage include details regarding what the individual is wearing while in the area of interest.

12. The method of claim 1 wherein the details that would be considered private by an individual appearing in, or associated with, the audio or video footage include details regarding objects in, or the physical configuration of, the area of interest.

13. The method of claim 1 wherein the quality level of the high-fidelity recording mode is sufficient to recognize the details that are not recognizable in the audio or video footage recorded in the low-fidelity recording mode.

14. The method of claim 1 further comprising:
upon the satisfaction of one or more conditions, disengaging the high-fidelity recording mode and returning to the low-fidelity recording mode.

15. The method of claim 14 wherein the one or more conditions include the passage of a preconfigured time interval or the receipt of an explicit command from the user.

16. The method of claim 1 further comprising:
in response to the detecting, performing an action based on the nature of the event.

17. The method of claim 16 wherein the action is configurable by the user.

18. A non-transitory computer readable medium having stored thereon program code executable by a processor, the program code comprising:
code that causes the processor to record audio or video footage of an area of interest on a continuous basis while operating in a low-fidelity recording mode, wherein the audio or video footage recorded in the low-fidelity recording mode has a quality level that is sufficient to detect one or more events that have meaning to the processor or a user, but is insufficient to recognize details with respect to the area of interest that would be considered private to an individual appearing in, or associated with, the audio or video footage;
code that causes the processor to detect an occurrence of one of the one or more events in the audio or video footage recorded in the low-fidelity recording mode; and
code that causes the processor to, in response to the detecting, switch from the low-fidelity recording mode to a high-fidelity recording mode, wherein while operating in the high-fidelity recording mode, the processor is configured to record audio or video footage of the area of interest at a quality level that is higher than the quality level of the low-fidelity recording mode.

19. An always-on A/V monitoring system comprising:
a processor; and
a non-transitory computer readable medium having stored thereon executable program code which, when executed by the processor, causes the processor to:
record audio or video footage of an area of interest on a continuous basis while operating in a low-fidelity recording mode, wherein the audio or video footage recorded in the low-fidelity recording mode has a quality level that is sufficient to detect one or more events that have meaning to the always-on A/V monitoring system or a user, but is insufficient to recognize details with respect to the area of interest that would be considered private to an individual appearing in, or associated with, the audio or video footage;
detect an occurrence of one of the one or more events in the audio or video footage recorded in the low-fidelity recording mode; and
in response to the detecting, switch from the low-fidelity recording mode to a high-fidelity recording mode, wherein while operating in the high-fidelity recording mode, the always-on A/V monitoring system is configured to record audio or video footage of the area of interest at a quality level that is higher than the quality level of the low-fidelity recording mode.

* * * * *